United States Patent
Wei et al.

(10) Patent No.: US 9,386,439 B2
(45) Date of Patent: Jul. 5, 2016

(54) DEVICE-TO-DEVICE COMMUNICATION DEVICES, SYSTEMS AND RELATED DEVICE-TO-DEVICE WIRELESS COMMUNICATIONS METHODS

(71) Applicant: Industrial Technology Research Institute, Hsinchu (TW)

(72) Inventors: Hung-Yu Wei, Taipei (TW); Ching-Chun Chou, Taipei (TW); Shih-Lung Chao, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 234 days.

(21) Appl. No.: 14/167,949

(22) Filed: Jan. 29, 2014

(65) Prior Publication Data

US 2014/0220895 A1    Aug. 7, 2014

Related U.S. Application Data

(60) Provisional application No. 61/759,815, filed on Feb. 1, 2013.

(30) Foreign Application Priority Data

Jan. 8, 2014  (TW) .............................. 103100617 A

(51) Int. Cl.
  *H04W 4/00*    (2009.01)
  *H04W 8/00*    (2009.01)
  *H04W 4/02*    (2009.01)
(52) U.S. Cl.
  CPC .............. *H04W 8/005* (2013.01); *H04W 4/005* (2013.01); *H04W 4/023* (2013.01)
(58) Field of Classification Search
  CPC ... H04W 64/00; H04W 4/02; H04L 29/08657
  USPC ........................ 455/456.1, 404.2, 158.3, 41.1
  See application file for complete search history.

(56) References Cited

U.S. PATENT DOCUMENTS 4,406,018 A * 9/1983 Motohashi ................ H03J 7/02
                                                      455/164.1
5,126,639 A * 6/1992 Srivastava .............. H04N 5/126
                                                      315/364

(Continued)

FOREIGN PATENT DOCUMENTS

TW    201318382    5/2013
TW    201345295    11/2013

OTHER PUBLICATIONS

Taiwan Patent Office, Office Action, Patent Application Serial No. 103100617, May 21, 2015, Taiwan.

(Continued)

*Primary Examiner* — Wen Huang

(57) ABSTRACT

A communication device for performing device-to-device (D2D) wireless communications with a first neighboring communication device is provided. The D2D communication device includes a wireless module, a counter, and a controller module. The wireless module performs wireless transmissions and receptions. The counter has a count value and a threshold value. The controller module determines whether to broadcast proximity signal via the wireless module according to a comparison result of the count value and the threshold value, wherein the controller module determines to broadcast a first proximity signal to the first neighboring communication device via the wireless module when the count value reaches the threshold value, wherein the count value of the counter is changed according to a second proximity signal broadcasted by the first neighboring communication device.

28 Claims, 10 Drawing Sheets

(56) References Cited

U.S. PATENT DOCUMENTS

| | | | |
|---|---|---|---|
| 6,269,099 B1 | 7/2001 | Borella et al. | |
| 7,412,518 B1 | 8/2008 | Duigou et al. | |
| 7,606,173 B2* | 10/2009 | Lal | G01S 5/0284 370/254 |
| 8,005,091 B2 | 8/2011 | Wu et al. | |
| 8,068,454 B2 | 11/2011 | Bonta et al. | |
| 8,069,232 B2 | 11/2011 | Silverman et al. | |
| 8,134,931 B2 | 3/2012 | Laroia et al. | |
| 8,189,508 B2 | 5/2012 | Park et al. | |
| 8,248,978 B2 | 8/2012 | Zhang et al. | |
| 8,260,266 B1 | 9/2012 | Amidoen et al. | |
| 8,300,615 B2 | 10/2012 | Copeland et al. | |
| 8,315,340 B1* | 11/2012 | Kim | H04L 5/0005 375/316 |
| 8,965,398 B2* | 2/2015 | Zhu | 370/338 |
| 2006/0154598 A1* | 7/2006 | Rudland | H04L 12/185 455/3.01 |
| 2006/0182056 A1* | 8/2006 | Kim | H04W 52/0229 370/328 |
| 2007/0202865 A1* | 8/2007 | Moride | H04W 88/06 455/419 |
| 2008/0293388 A1* | 11/2008 | Sobieszek | H04M 1/006 455/414.1 |
| 2010/0165882 A1 | 7/2010 | Palanki et al. | |
| 2011/0063995 A1 | 3/2011 | Chen et al. | |
| 2011/0143666 A1* | 6/2011 | Lee | H04M 1/2745 455/41.2 |
| 2011/0228666 A1 | 9/2011 | Barbieri et al. | |
| 2011/0258313 A1 | 10/2011 | Mallik et al. | |
| 2011/0268101 A1 | 11/2011 | Wang et al. | |
| 2011/0282989 A1 | 11/2011 | Geirhofer et al. | |
| 2012/0011247 A1 | 1/2012 | Mallik et al. | |
| 2012/0022948 A1 | 1/2012 | Jones et al. | |
| 2012/0269250 A1 | 10/2012 | Li et al. | |
| 2013/0142059 A1* | 6/2013 | Di Girolamo | H04L 12/66 370/252 |
| 2013/0217332 A1* | 8/2013 | Altman | H04H 60/90 455/41.2 |
| 2014/0204945 A1* | 7/2014 | Byun | H04L 45/74 370/392 |
| 2014/0274031 A1* | 9/2014 | Menendez | H04W 52/0209 455/426.1 |
| 2015/0123950 A1* | 5/2015 | Ding | G06F 3/0418 345/178 |
| 2015/0245179 A1* | 8/2015 | Jarvis | H04L 43/0817 455/456.1 |
| 2015/0327188 A1* | 11/2015 | Bagheri | H04W 52/383 455/426.1 |

OTHER PUBLICATIONS

"3rd Generation Partnership Project; Technical Specification Group Services and System Aspects; Feasibility study for Proximity Services (ProSe) (Release 12)," 3GPP TR 22.803 V12.0.0, vol. 22.803, No. V12.0.0, Dec. 2012, 40 pages, 3GPP Organizational Partners.

"Architecture Consideration for Proximity Services with Infrastructure," SA WG2 Meeting #95, Jan. 2013, 4 pages, Czech Republic.

Study on Proximity-based Services, 3GPP SA Plenary Meeting #53, Sep. 2011, 5 pages, Japan.

Gabor Fodor et al., "Design Aspects of Network Assisted device-to-Device Communications," IEEE Communications Magazine, Mar. 2012, pp. 170-177, vol. 50, Issue 3, IEEE, US.

Xinzhou Wu et al., "FlashLinQ: a Synchronous Distributed Scheduler for Peer-to Peer Ad Hoc Networks," Forty-eighth Annual Allerton Conference, Sep. 2010, pp. 514-521, IEEE, US.

M. Scott et al., "Toward Proximity-Aware Internetworking," IEEE Wireless Communications, Dec. 2010, pp. 26-33, IEEE, US.

Geoffrey Werner-Allen et al., "Firefly-Inspired Sensor Network Synchronicity with Realistic Radio Effects," Proceedings of the 3rd international conference on Embedded networked sensor systems, Nov. 2005, pp. 142-153, ACM, US.

Alberto Vigato et al., "Joint Discovery in Synchronous Wireless Networks," IEEE Transactions on Communications, Aug. 2011, pp. 2296-2305, vol. 59, No. 8, IEEE, US.

Klaus Doppler et al., "Device-to-Device Communication as an Underlay to LTE-Advanced Networks," IEEE Communications Magazine, Dec. 2009, pp. 42-49, IEEE, US.

Alexander Tyrrell et al., "Fireflies as Role Models for Synchronization in Ad Hoc Networks," Bio-Inspired Models of Network, Information and Computing Systems, 2006. Dec. 1, 2006, pp. 1-7, IEEE, US.

Alexander Tyrrell et al., "Imposing a Reference Timing onto Firefly Synchronization in Wireless Networks," Vehicular Technology Conference, 2007. VTC2007-Spring. IEEE 65th, Apr. 2007, pp. 222-226, IEEE, US.

Luca Schenato et al., "A distributed consensus protocol for clock synchronization in wireless sensor network," Decision and Control, 2007 46th IEEE Conference on, Dec. 2007, pp. 2289-2294, IEEE, US.

\* cited by examiner

| Time t | 0 | 1 | 2 | 3 | 4 | 5 | 6 | 7 | 8 | 9 |
|---|---|---|---|---|---|---|---|---|---|---|
| UE#1 Counter | 2 | 9 | 0 | 1 | 2 | 3 | 4 | 5 | 8 | 9 |
| UE#2 Counter | 8 | 0 | 4 | 5 | 6 | 7 | 8 | 9 | 0 | 1 |
| UE#3 Counter | 9 | 0 | 4 | 5 | 6 | 7 | 8 | 9 | 0 | 1 |

DEVICE-TO-DEVICE COMMUNICATION DEVICES, SYSTEMS AND RELATED DEVICE-TO-DEVICE WIRELESS COMMUNICATIONS METHODS

CROSS REFERENCE TO RELATED APPLICATIONS

This application claims the benefit of U.S. Provisional Application No. 61/759,815, filed on Feb. 1, 2013, and Taiwan Application No. 103100617, filed on Jan. 8, 2014, the entirety of which are incorporated by reference herein.

TECHNICAL FIELD

The application generally relates to Device-to-Device (D2D) communication devices, systems and related D2D wireless communications methods.

BACKGROUND

In a typical wireless communications environment, an user equipment (UE) may communicate voice and/or data signals with one or more service networks via cellular stations (or referred to as evolved Node-Bs (eNBs) of service networks. The wireless communications between the UE and the service networks may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, and others.

As one of next-generation wireless communications systems, the Third Generation Partnership Project (3GPP) LTE provides technologies for high data rates and system capacity. Further, LTE-A is defined to support new components for LTE to meet higher communications demands. Device-to-Device (D2D) communications is a technology component for LTE-A. D2D communications enables two or more devices in proximity of each other, that could be called proximity devices or neighboring devices, to establish direct local links, either in an autonomous manner to form an ad hoc network or coordinated by a base station, and to setup communications and/or to perform direct data transfer.

However, there are many issues to be addressed before the concept of D2D communications can be implemented and commercialized. One of the issues is how to find device proximity. Recently, the 3GPP has researched proximity based services (ProSe) for D2D communications in LTE wireless communications system. However, the existing solution for distributed D2D proximity discovery in the LTE wireless communications system is less likely to see. Moreover, in current LTE wireless communications system, separate signaling messages must be used for finding D2D device(s) with sufficient signal strength, finding D2D device(s) with the same application interest/requirement and synchronization among the D2D devices.

SUMMARY

Device-to-device (D2D) communications devices, systems and related device-to-device (D2D) wireless communications methods are provided. In accordance with the application an exemplary embodiment of a communication device for performing device-to-device (D2D) wireless communications with a first neighboring communication device is provided. The communication device includes a wireless module, a counter, and a controller module. The wireless module performs wireless transmissions and receptions. The counter has a count value and a threshold value. The controller module determines whether to broadcast proximity signal via the wireless module according to a comparison result of the count value and the threshold value, wherein the controller module determines to broadcast a first proximity signal to the first neighboring communication device via the wireless module when the count value reaches the threshold value, wherein the count value of the counter is changed according to a second proximity signal broadcasted by the first neighboring communication device.

In accordance with the application an exemplary embodiment of device-to-device (D2D) communications system including at least a first and second communication device for performing D2D wireless communications is provided, wherein each of the first and second communication device includes a wireless module, a counter and a controller module. The wireless module performs wireless transmissions and receptions. The counter has a count value and a threshold value. The controller module determines whether to broadcast proximity signal via the wireless module according to a comparison result of the count value and the threshold value, wherein the controller module of the first communication device determines to broadcast a first proximity signal to the second communication device via the wireless module when the count value reaches the threshold value, wherein the count value of the first communication device is changed according to a second proximity signal broadcasted by the second communication device.

In accordance with the application an exemplary embodiment of a device-to-device (D2D) wireless communications method for use in a D2D communications system is provided, wherein the D2D communications system comprising at least a first and second communication device. The D2D communications method may include the steps of determining, by the first communication device, whether to broadcast a first proximity signal according to a comparison result of a count value and a threshold value of a counter of the first communication device, and determining, by the first communication device, to broadcast the first proximity signal to the second communication device when the count value of the first communication device reaches the threshold value, wherein the count value of the first communication device is changed according to a second proximity signal broadcasted by the second communication device.

The principles of aspects and features of the application will become apparent to those with ordinary skill in the art upon review of the following descriptions of specific embodiments of the D2D communications systems and the related D2D wireless communications methods.

BRIEF DESCRIPTION OF DRAWINGS

The application can be more fully understood by reading the subsequent detailed description and exemplary embodiments with references made to the accompanying drawings, wherein.

DETAILED DESCRIPTION OF THE EMBODIMENTS

This description is made for the purpose of illustrating the general principles of the application and exemplary embodiments will be described in detail with reference to accompanying drawings so as to be easily realized by a person having ordinary knowledge in the art. The inventive concept may be embodied in various forms without being limited to the exemplary embodiments set forth herein.

As described above, there are many issues to be addressed before the concept of D2D communications can be implemented and commercialized. An issue is to find device proximity. The proximity discovery can be categorized into physical communication level proximity discovery and application level discovery. Proximity discovery for physical communication level focuses on the connectivity of wireless communications. If two D2D devices find each other, or exchange wireless signals therebetween, they are consider "in proximity". Proximity discovery on application level focuses on the interest of application. D2D devices which share the same interest in specific applications are deemed "in proximity".

The integration of two proximity discoveries is desired because the signaling procedures can be reduced. For example, physical communications level proximity discovery requires the signal to be exchanged among the D2D devices. This is to ensure that the D2D devices are geographically neighboring or in proximity and able to exchange signaling messages. Timing alignment may also be mandatory to exchange messages therebetween. Application level proximity discovery requires the D2D device(s) to find other D2D device(s) with similar interests. In general cases, these D2D devices are running the same application and they may be willing to establish the connection. These two circumstances could be viewed as synchronization in physical or application levels, generating significant amount of signaling messages.

Embodiments of the application provide methods for proximity discovery in device-to-device (D2D) communication environments. The method achieves application layer proximity discovery by sending and detecting proximity signals among D2D devices in a D2D communications system. Embodiments of the application, in addition to proximity discovery, may further facilitate the synchronization among D2D devices, keep D2D devices alive, or trigger applications or transmissions among the D2D devices. In accordance with the embodiments of the application, the User Equipments of the D2D communications in a wireless communications system is not limited to mobile user equipments, and which could apply to fixed line user equipments also.

Figure 1:
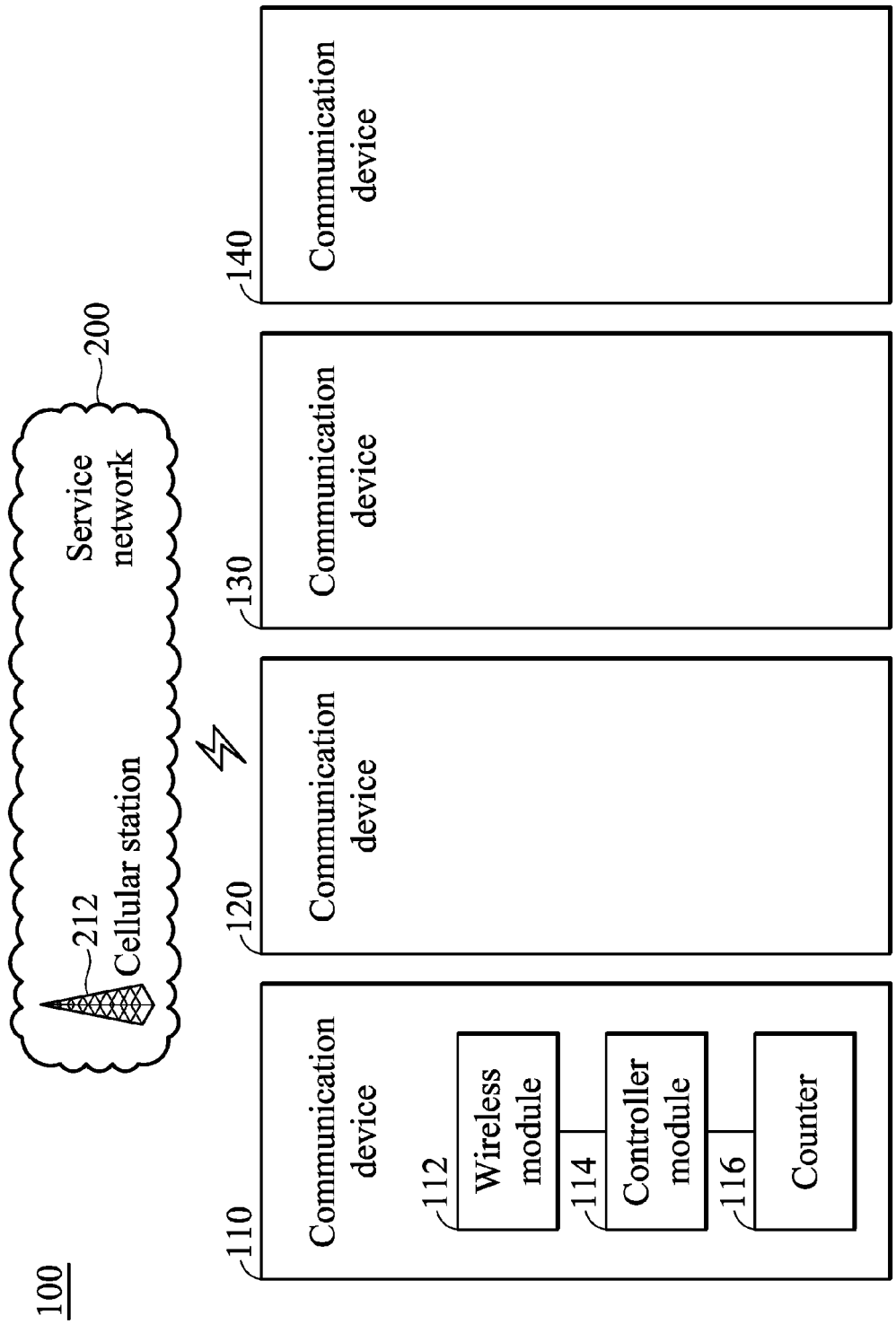
FIG. 1 is a block diagram illustrating a D2D communications system according to an exemplary embodiment of the application.

FIG. 1 is a block diagram illustrating a D2D communications system 100 according to an exemplary embodiment of the application. In the D2D communications system 100, the communication device 110 is wirelessly connected to the cellular station 212 of the service network 200 for obtaining wireless services. Generally, the communication device 110 may be referred to as a User Equipment (UE) and the cellular station 212 may be referred to as a base station, an access station or an evolved Node B (eNB). In this embodiment, the communication device 110 may be a D2D capable device which is a device supporting D2D communications and can be used for performing D2D communications with other D2D capable devices 120-140 or systems. The communication devices 120-140 coulbe be D2D capable devices with communication hardware structure and functionality which similar with those of the communication device 110 and the communication devices 120-140 in proximity of the communication device 110, which can be referred to as proximity devices/neighboring devices of the communication device 110. The communication device 110 comprises a wireless module 112 for performing the functionality of wireless transmissions and receptions to and from the cellular station 212 or other D2D capable devices. To further clarify, the wireless module 112 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the communication system, wherein the radio frequency may be 900 MHz, 1900 MHz, or 2100 MHz utilized in WCDMA systems, or may be 900 MHz, 2100 MHz, or 2.6 GHz utilized in LTE systems, or others depending on the radio access technology (RAT) in use. Also, the communication device 110 further comprises a controller module 114 for controlling the operation of the wireless module 112 and other functional components, such as a display unit and/or keypad serving as the MMI (man-machine interface), a storage unit storing the program codes of applications or communication protocols, or others. The service network 200 may also comprise a control node for controlling the operation of the at least one access node. The operation of the service network 200 is in compliance with a communication protocol. In one embodiment, the service network 200 may be an LTE network and the communication device 110 may be a UE in compliance with one of the specifications of the LTE communication protocols, and the application is not limited thereto. In addition, the communication device 110 may further comprise a counter 116 for determining whether or when to broadcast proximity signals to other D2D devices. The counter 116 may have a count value and the count value may be increased by time (e.g., increased by a predetermined amount per time slot) and a threshold value is set for the counter. For example, the counter can be implemented by a distributed counter or be implemented using an integrator or the like, but the application is not limited thereto. The rate of counter increment may be different for distinct D2D devices. Devices detecting the proximity signals will increase their count values by a predetermined/fixed amount. Once the counter of a D2D device reaches the threshold value, the D2D device will broadcast the proximity signal, and then reset the count value back to zero after sending out the proximity signal. The proximity signal is then broadcasted to the neighboring D2D devices to increase their count values accordingly. In some embodiments, the rate of increment and threshold value for the counter may be different for all D2D devices. The process of proximity signal broadcast and detection will continue before all the D2D devices achieve synchronization in the period of signal broadcast.

The controller module 114 controls the wireless module 112 for performing a proximity discovery procedure with other neighboring D2D devices for D2D communication.

In some embodiments, the controller module 114 may determine to broadcast a first proximity signal to a first neighboring communication device (e.g. the communication device 120) via the wireless module 113 when the count value reaches the threshold value, wherein the count value of the counter is changed according to a second proximity signal broadcasted by the first neighboring communication device. The controller module 114 may further detect in proximity of the first neighboring communication device when receiving the second proximity signal broadcasted by the first neighboring communication device. In some embodiments, the first and second proximity signals can be same or different proximity signal.

Figure 2:
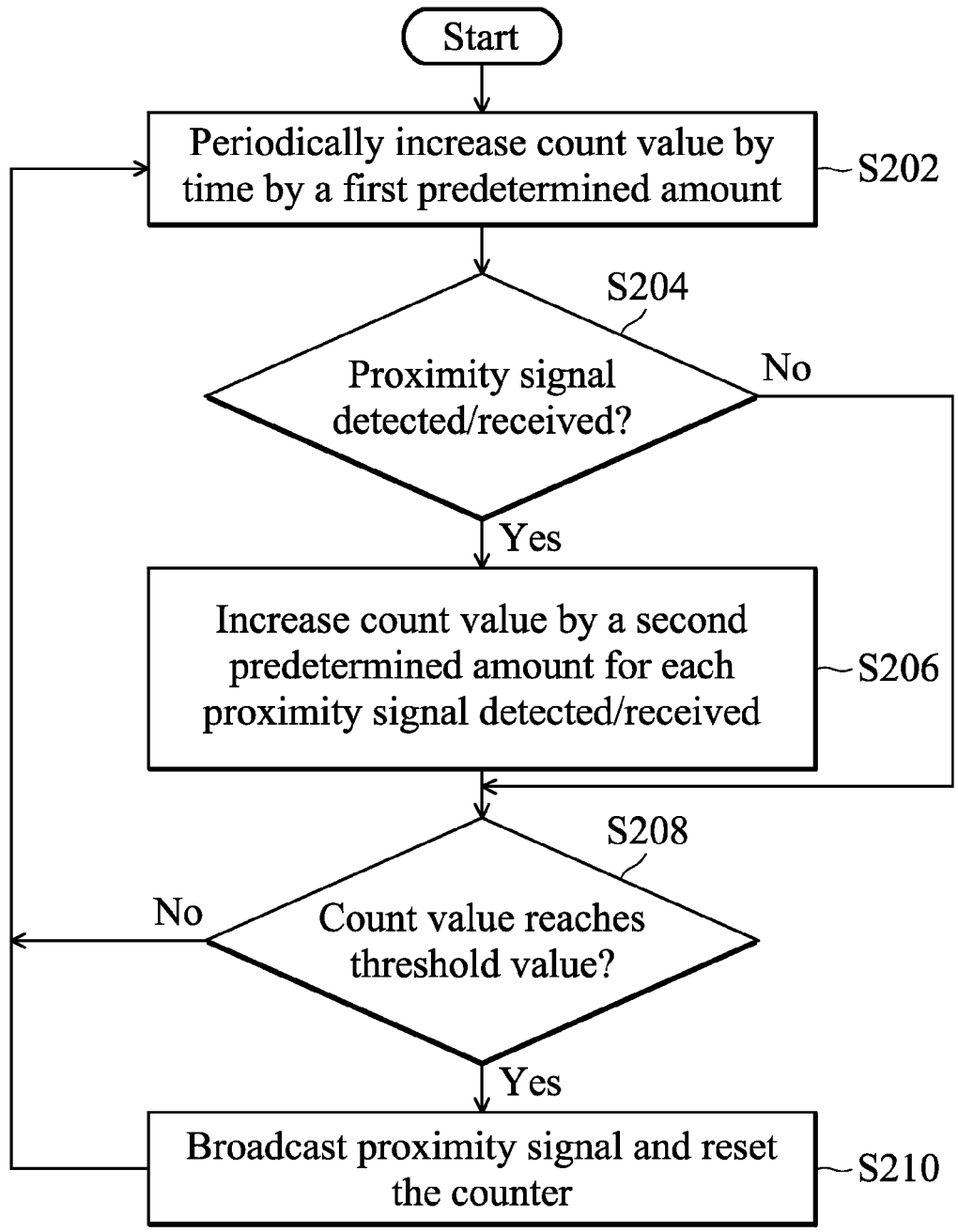
FIG. 2 is a flow chart illustrating a D2D communications method for proximity discovery in a D2D communications system according to an exemplary embodiment of the application.

FIG. 2 is a flow chart illustrating a D2D communications method for proximity discovery in a D2D communications system according to an exemplary embodiment of the application. In this embodiment, the D2D communications method may be applied in each communication device of the D2D communications system 100 as shown in FIG. 1, wherein the wireless module 112 is used for performing the functionality of wireless transmissions and receptions to and from the network entity (e.g. the cellular station 212) or the other neighboring devices. In this embodiment, it is assumed that the count value of the counter 116 is initially set to be zero.

First, in step S202, the controller module 114 increases the count value of the counter 116 by time by a first predetermined amount and then in step S204, continuously detects if any proximity signal has been broadcasted/received. For example, the count value may be increased with time in a fixed rate (e.g., increased by a predetermined amount, one per time slot). If the controller module 114 receives a proximity signal from other neighboring device (e.g. the communication device 130) (Yes in step S204), in step S206, the controller module 114 increases the count value of the counter 116 by a second predetermined amount for each proximity signal received/detected. For example, if the first predetermined amount is set to be 1 and the second predetermined amount is set to be 3, the count value is changed from 0 to 4 if the controller module 114 receives one proximity signal from one of the neighboring devices or from 0 to 7 if the controller module 114 receives two proximity signals from two of the neighboring devices at the same time. Next, the controller module 114 further determines whether to broadcast the proximity signal according to a comparison result of the count value and the threshold value. In step S208, the controller module 114 further determines whether the count value has exceeded the threshold value. If the count value has not exceeded the threshold value (No in step S208), which represents that no proximity signal is to be broadcasted, the controller module 114 returns to step S202 for subsequent counter increment. Once the count value reaches the threshold value (Yes in step S208), in step S210, the controller module 114 broadcasts the proximity signal, and then resets the counter to zero. After the counter has been reset to zero, the controller module 114 returns to step S202 for subsequent counter increment. Other communication devices (e.g. the communication devices 120-140) detecting the proximity signal broadcasted by the communication device 110 will increase their count values by a predetermined/fixed amount if they are running/interested in the same application as same as that of the communication device 110. It is to be understood that, if the communication device 130 can receive/detect the proximity signal broadcasted by the communication device 110, it should be in proximity of the communication device 110. Similarly, if the communication device 110 can receive/detect the proximity signal broadcasted by the communication device 130, it should be in proximity of the communication device 130. Thus, the communication device 110 can detect that it is in proximity of the communication device 130 when receiving the proximity signal broadcasted by the communication device 130.

In above-mentioned embodiments, the controller module 114 may increase the count value according to the pre-installed configuration parameters that are stored in the storage unit of the communication device 110. In some embodiments, the D2D system 100 may further provide a network entity for managing or configuring all of the D2D devices within the D2D system 100 and the controller module 114 may increase the count value according to the signaling messages from the network entity. The network entity may be the base station serving the communication device 110 (e.g. the cellular station 212), MME or specific node in the service network 200. The network entity (e.g. the cellular station 212 or MME) may facilitate the proposed operation (e.g. the proximity signal assignment and radio resource allocation) with network configuration support.

Figure 3A:
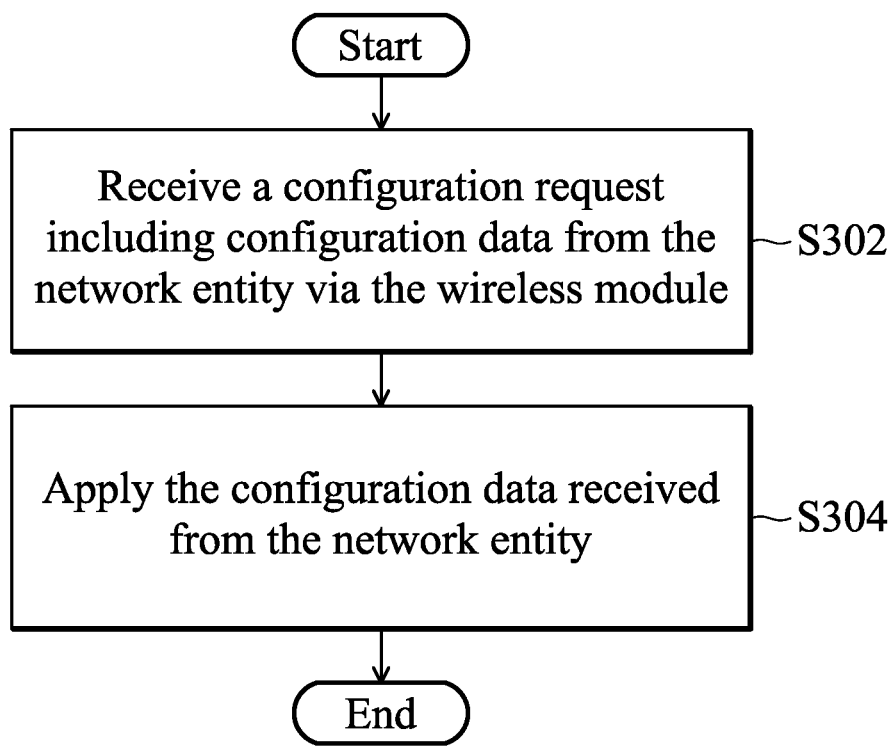
FIG. 3A is a flow chart illustrating a D2D communications method for configuring the communication devices in the D2D communications system triggering procedure according to an exemplary embodiment of the application.

FIG. 3A is a flow chart illustrating a D2D communications method for configuring the communication devices in the D2D communications system triggering procedure according to an exemplary embodiment of the application. In this embodiment, the triggering procedure may be applied in each of the communication devices of the D2D communications system 100, such as the communication device 110 shown in FIG. 1. When the controller module 114 of the communication device 110 receives any configuration request including configuration data from the network entity via the wireless module 112 (step S302), the controller module 114 obtains the configuration data included in the configuration request and applies the configuration data received from the network entity (step S304). Thereafter, the controller module 114 continues the aforementioned detection/counter increment process using the applied configuration data.

Figure 3B:
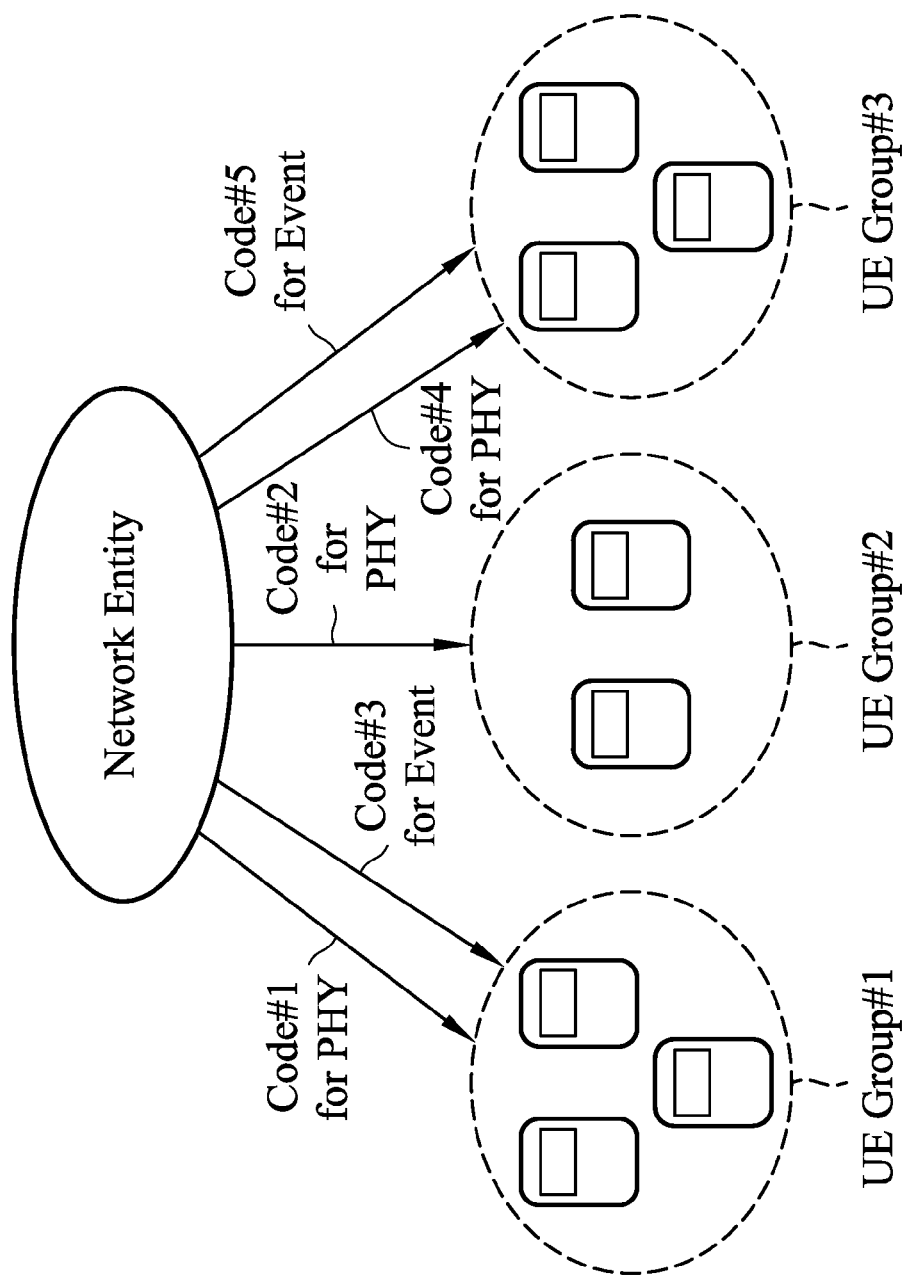
FIG. 3B shows a schematic diagram illustrating an embodiment of the random access code or preamble assignment for proximity signals in accordance with the application.

In one embodiment, the network entity may allocate codes or preambles for proximity signal transmission. In this embodiment, the network entity further configures a first proximity signal for a first group of the communication devices requesting for a first service and a second proximity signal for a second group of the communication devices requesting for a second service, wherein the first and second proximity signal is signal using different Random Access Channel (RACH) code. FIG. 3B shows a schematic diagram illustrating an exemplary embodiment of the random access code or preamble assignment for proximity signals in accordance with the application. In some embodiments, the proximity signal may be implement using other signaling mechanism, like CDMA code, specific radio signal patterns, or other recognizable signals. The network entity may also allocate different Random Access Channel (RACH) code for specific D2D group. For example, in this embodiment, different codes are assigned to different groups. In addition, two or more codes may be assigned to the same group to help the physical layer (PHY) synchronization and application event triggering. As shown in FIG. 3B, the network entity may configure a RACH code code#1 for use in PHY synchronization and a RACH code code#3 for use in application event triggering in the first UE group#1, a RACH code code#2 for use in PHY synchronization in the second UE group#2, and a RACH code code#4 for use in PHY synchronization and a RACH code code#5 for use in application event triggering in the third UE group#3. The network entity may further register and manage code-interest mapping information (e.g. information regarding which code is used to indicate what kind of application interest) in a network server/database (not shown). In other words, the code-interest mapping information records mapping between different RACH codes/RACH resources and corresponding applications/services. For example, the Code-Interest mapping information may record that the RACH code#1 corresponds to a first application, the RACH code#2 corresponds to a second application and so forth.

Figure 3C:
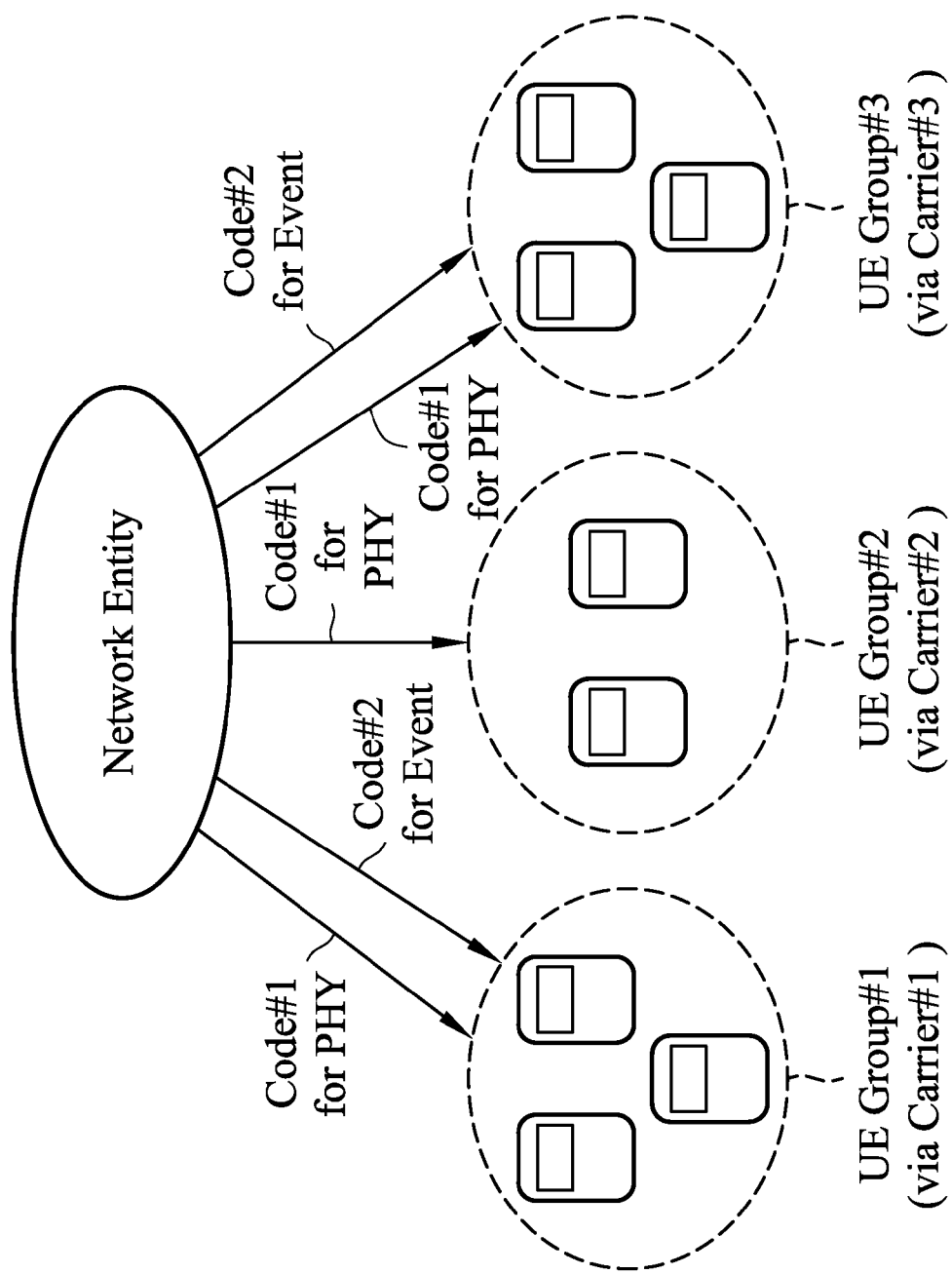
FIG. 3C shows a schematic diagram illustrating an exemplary embodiment of the resource allocation for different D2D UE groups in accordance with the application.

In another embodiment, the network entity may also manage and allocate radio resource (e.g. RACH resources) for proximity signal transmission periodically. In this embodiment, the network entity may further configure a first proximity signal for a first group of the communication devices requesting for a first service via a first resource and configure the first proximity signal for a second group of the communication devices requesting for a second service via a second resource, wherein the first and second resources are different RACH resources. For example, in some embodiments, different groups may be allocated different radio resources to reduce the consumption of random access code or preamble, as shown in 3C. FIG. 3C shows a schematic diagram illustrating an exemplary embodiment of the resource allocation for different D2D UE groups in accordance with the application. In some embodiments, the radio resources may be provided using different time, frequency, or radio resource blocks. As shown in FIG. 3C, the network entity may configure a RACH code code#1 for use in PHY synchronization and a RACH code code#3 for use in application event triggering in the first UE group#1 to the D2D devices within the first UE group#1 via a first carrier#1. The network entity may further configure the same RACH code code#1 for use in PHY synchronization to the D2D devices within the second UE group#2 and the third UE group#3 via a second carrier#2 and a third carrier#3, respectively.

The network entity (e.g. the cellular station 212) may further be used to adjust the synchronization policy and parameters of the D2D communications system 100. The network entity may distribute the policy and/or configuration data for synchronization through a control signaling channel (e.g. the control signaling channel may be a broadcast channel or unicast control channel). The exemplary parameters to be adjusted by the network entity may, for example, include: a formula to calculate the counter, the parameters to speed up or slow down the synchronization process, the criteria to trigger the proximity signal transmission, the adjustment of count value after transmitting a proximity signal and the periodic adjustment of count value (e.g. the counter may be increased by value Parameter_Increment for every second), and the application is not limited thereto.

The network entity (e.g. the cellular station 212) is in an IDLE state if no configuration is required. If the D2D system 100 with the D2D devices using the proposed mechanism requires configuration, the network entity can distribute the configuration data to one or more of the D2D devices for configuring a portion or all of the D2D devices. After the configuration distribution, the network entity returns to the IDLE state. The configuration may be done off-line prior to the beginning of the service, at the beginning of the service or dynamically for adaptive operation. Further, the policy, parameter configuration or code assignment by the network entity may be maintained or updated during operation.

As previously described, in addition to proximity discovery, the D2D communications method of the application may further facilitate the synchronization among D2D devices, keep D2D devices alive, or trigger applications or transmissions among the D2D devices after a group of the D2D devices are synchronized. In an embodiment, the D2D devices which use the same proximity signal will be grouped into a same D2D group.

In an exemplary embodiment, a synchronization mechanism for a D2D communications system (e.g. the D2D communications system 100) is provided. Synchronization among the D2D devices (e.g. the communication devices 110 to 140) can be achieved by synchronizing the transmission and reception timing of the proximity signals. Each D2D device may transmit proximity signal to its neighboring devices for proximity discovery and synchronization purposes. The proximity signal may be transmitted, for example, in a periodic manner or the proximity signal may be transmitted depending on the count value of a D2D device or reception of the proximity signal. For each D2D device, a counter is utilized to determine when to transmit the proximity signal. In some embodiments, the counter may be increased periodically or be changed upon receiving proximity signal sent from another device. The D2D device may send a proximity signal based on the count value. For example, the D2D device may transmit a proximity signal when the count value reaches the threshold value or the count value may be reduced a certain constant value and the count value may be reset to zero after sending a proximity signal.

In some embodiments, the communication device 110 is synchronized with the first neighboring communication device (e.g. the communication device 120) using a third proximity signal such that the communication device 110 and the first neighboring communication device transmit the third proximity signal at the same time.

Figure 4:
FIG. 4 is a schematic diagram illustrating an exemplary embodiment of a table indicating the count value variations among D2D devices within a D2D group during a synchronization process in accordance with the application.

FIG. 4 is a schematic diagram illustrating an exemplary embodiment of a table 400 indicating the count value variations among the communication devices (or also referred to as the D2D devices) UE#1-UE#3 during the synchronization process in accordance with the application. In this embodiment, assuming that there are three D2D devices UE#1, UE#2 and UE#3 which are with the same proximity signal and not synchronized at first, wherein the threshold value of each counter is set to be a predetermined value 10 and the phase increasing rate for the counter is set to be 1 per time slot when there is no proximity signal received. In addition, the counter increment is set to be a predetermined value 3 when each proximity signal is received.

As shown in FIG. 4, when the synchronization process begins, the counters of the three D2D devices UE#1, UE#2 and UE#3 have values of 2, 8, and 9, respectively. Obvious, these three devices were not synchronized. At time t=1, the counter of the third D2D device UE#3 reaches the threshold value and thus the third D2D device UE#3 sends the proximity signal to the other D2D devices UE#1 and UE#2. After receiving the proximity signal sent by the D2D device UE#1, in addition to the ordinary increment 1, the D2D devices UE#2 and UE#3 also got an increment, 3, on their counters. This made the count value of the D2D device UE#2 also reaches the threshold value. Thus, the D2D device UE#2 also sends a proximity signal to other D2D devices UE#1 and UE#3. After sending the proximity signal, the count values of the two devices UE#2 and UE#3 are reset to zero. By observing the phase shift at time t=1, it can be observed that the count value of the D2D device UE#1 has just gone through two phase leaps which were generated by UE#2 and UE#3, respectively. Also the phases of UE#2 and UE#3 are now synchronized.

At time t=2, the D2D device UE#1 will send the proximity signal since its counter reaches the threshold value 10 by adding one ordinary step, say 1. The proximity signal sent by the D2D device UE#1 has also changed the count values of the D2D devices UE#2 and UE#3 drastically from 1 to 4. After that, the counter of the D2D device UE#1 was reset to 0. From time t=3 to 7, since no device reached the threshold value, there is no proximity signal received. Thus, the three D2D devices increase their counters by an ordinary rate, say 1, during each time slot. At time t=8, since the timing of the D2D devices UE#2 and UE#3 are already synchronized, the received proximity signal strength is doubled. Thus, the D2D device UE#1 had two phase leap at once, thereby the counter of the D2D device UE#1 reaches the threshold value, which is the same as those of the others D2D devices. The three devices UE#1, UE#2 and UE#3 are now in sync. After several steps, all of the D2D devices UE#1-UE#3 with the same proximity signal will reach a state where the timing of proximity signal are well aligned. That is, the D2D device UE#1 knows the timing of transmitting proximity signal of the D2D devices UE#2 and UE#3. The devices UE#2-UE#3 also knows the timing of other UEs. As a result, the D2D devices UE#1-UE#3 are synchronized through the well-aligned timing of proximity signals. After the D2D devices UE#1-UE#3 have been synchronized, as the timing of the proximity signal is well aligned, the D2D devices UE#1-UE#3 will eventually transmit the proximity signal at the same time.

In some embodiments, after the D2D devices are in sync, a number of communication activities can be further performed among the synchronized D2D devices.

In another exemplary embodiment, a keepalive signaling mechanism for a D2D communications system is further provided. The keepalive signaling mechanism may be applied to check the status of the D2D devices within the same group, such as the existence of a neighboring D2D device, the existence of wireless connectivity to a neighboring D2D device or the like. Specifically, the keepalive signaling mechanism may be applied to check the existence of a neighboring device with the same application interest. The proximity signal in this case can be used to indicate the existence of a neighboring D2D device, the existence of wireless connectivity to a neighboring D2D device or the existence of a neighboring device with the same application interest. The keepalive signaling mechanism can be achieved by skipping some transmissions of the proximity signals to detect if neighboring devices are still alive. It is determined that a neighboring device is alive if the proximity signal broadcasted by the neighboring device can be detected; otherwise, it is determined that the neighboring device is not alive (or dead). In one embodiment, the transmissions of the proximity signals are skipped periodically. In another embodiment, the transmissions of the proximity signals are skipped randomly. In yet another embodiment, the skipping of the transmissions of the proximity signals may be configured by the network entity.

In some embodiments, a second neighboring communication device is in proximity of the communication device 110, wherein the communication device 110, the first, and second neighboring communication devices form a D2D group after the communication device 110, the first, and second neighboring communication devices are synchronized using a fourth proximity signal and the D2D group further performs a keepalive procedure to check the existence of the third communication device, wherein the D2D group performs the keepalive procedure by skipping a transmission of the fourth proximity signal during a first time period, detecting whether the second neighboring communication device did not transmit the fourth proximity signal during the first time period and determining that the second neighboring communication device is alive or not alive according to a determination result.

Figure 5A:
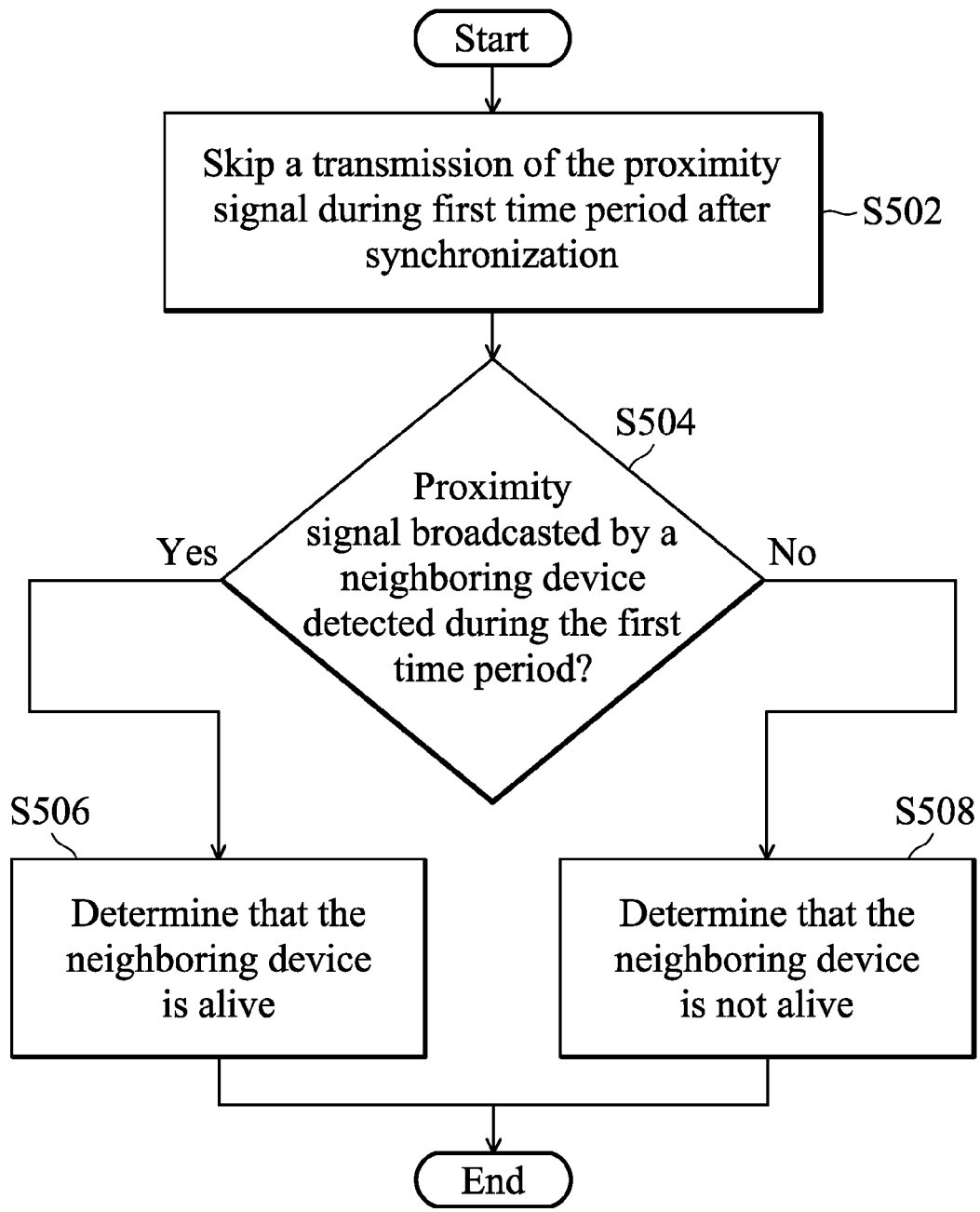
FIG. 5A is a flow chart illustrating a keepalive procedure according to an exemplary embodiment of the application.

FIG. 5A is a flow chart illustrating a keepalive procedure according to an exemplary embodiment of the application. In this embodiment, the keepalive procedure may be applied in each of the communication devices (or the D2D devices) of the D2D communications system 100 as shown in FIG. 1. The keepalive procedure may further comprise steps of skipping the transmission of the proximity signal during a first time period (step S502) and detecting whether proximity signal broadcasted by any neighboring device can be detected during the first time period (step S504). If so (Yes in step S504), it is determined that the neighboring device is alive (step S506). If not (No in step S504), it is determined that the neighboring device is not alive (step S508).

Figure 5B:
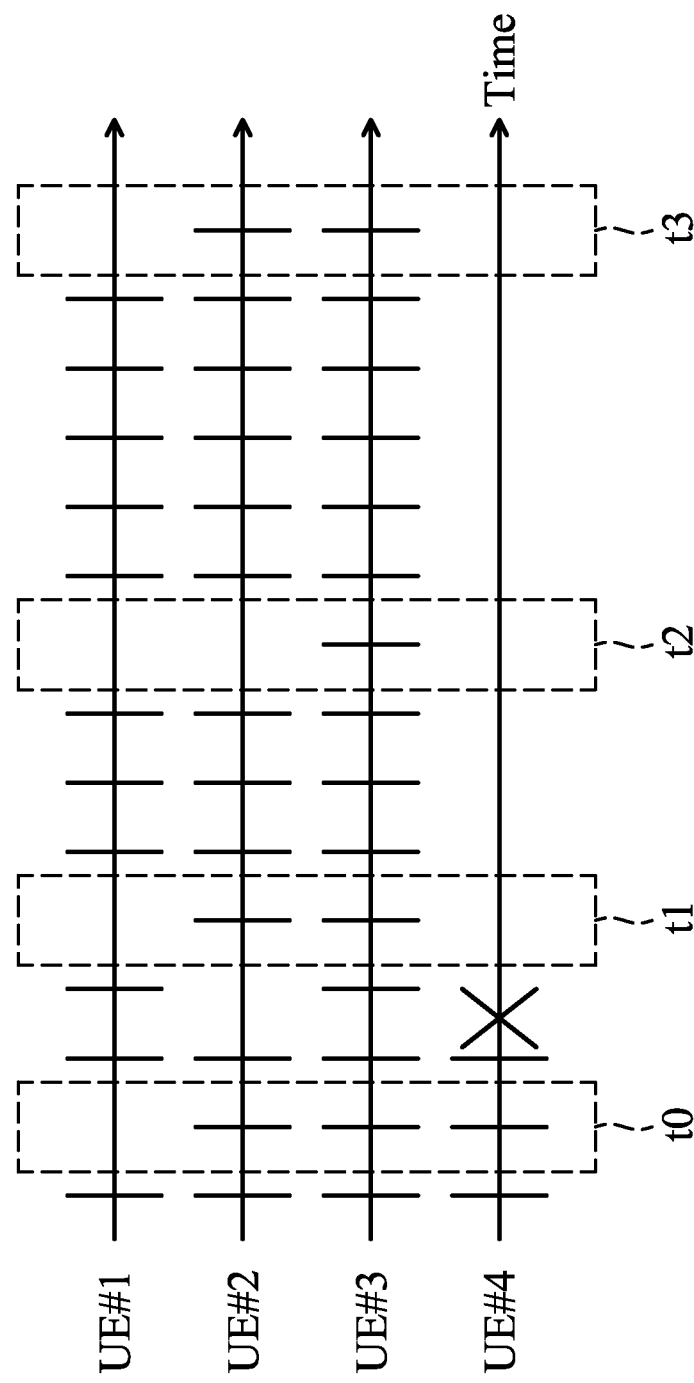
FIG. 5B is a schematic diagram illustrating an exemplary embodiment of Keep-alive signaling mechanism in accordance with the application.

FIG. 5B is a schematic diagram illustrating an exemplary embodiment of a keepalive signaling mechanism in accordance with the application. As shown in FIG. 5B, D2D devices UE#1~UE#4 form a D2D group. It is assumed that the D2D devices UE#1~UE#4 are synchronized using the proximity signal, and thus their timing of broadcasting proximity signal are the same at time period t0. The D2D devices UE#1~UE#4 are further performed a keepalive procedure to check the existence of the D2D devices after the D2D devices UE#1~UE#4 have been synchronized. To be more specific, the D2D devices UE#1~UE#4 may skip the transmission of proximity signal to detect if neighboring devices are still alive. For example, the D2D device UE#1 may skip some proximity signals broadcast to detect the existence, the wireless connectivity, or interests on specific services of neighboring devices, UE#2~UE#4. In FIG. 5B, the D2D device UE#1 may know that the D2D device UE#4 is dead or not alive because the D2D device UE#4 missed all the proximity signals at the time period t1, t2 and t3. Similarly, the D2D device UE#1 will know that the D2D device UE#2 is still alive because it just happens to skip the same proximity signal at time period t2.

Figure 6A:
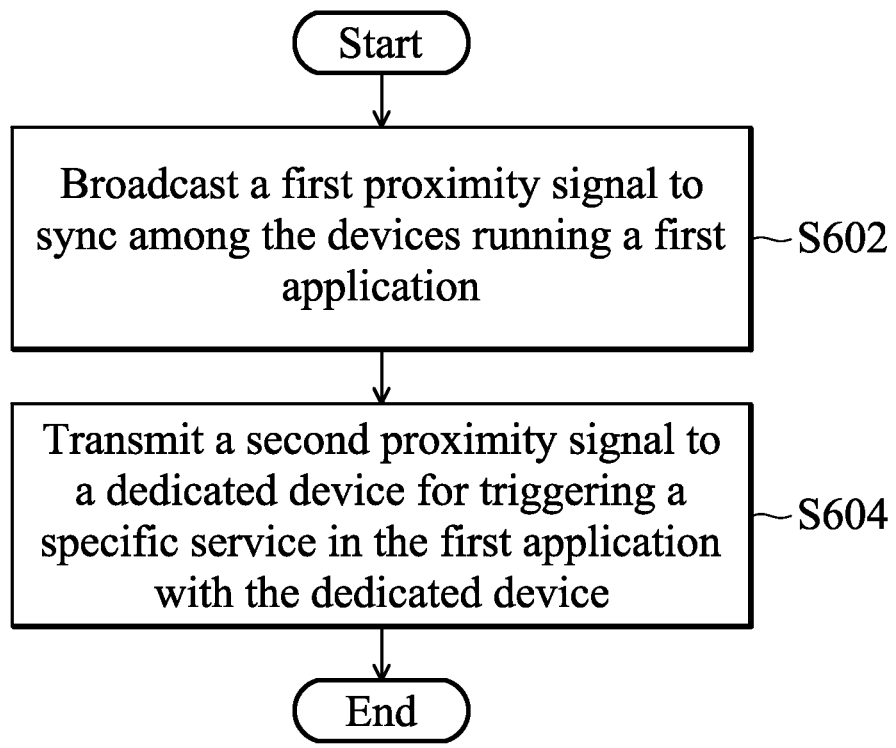
FIG. 6A is a flow chart illustrating a triggering procedure according to an exemplary embodiment of the application.
Figure 6B:
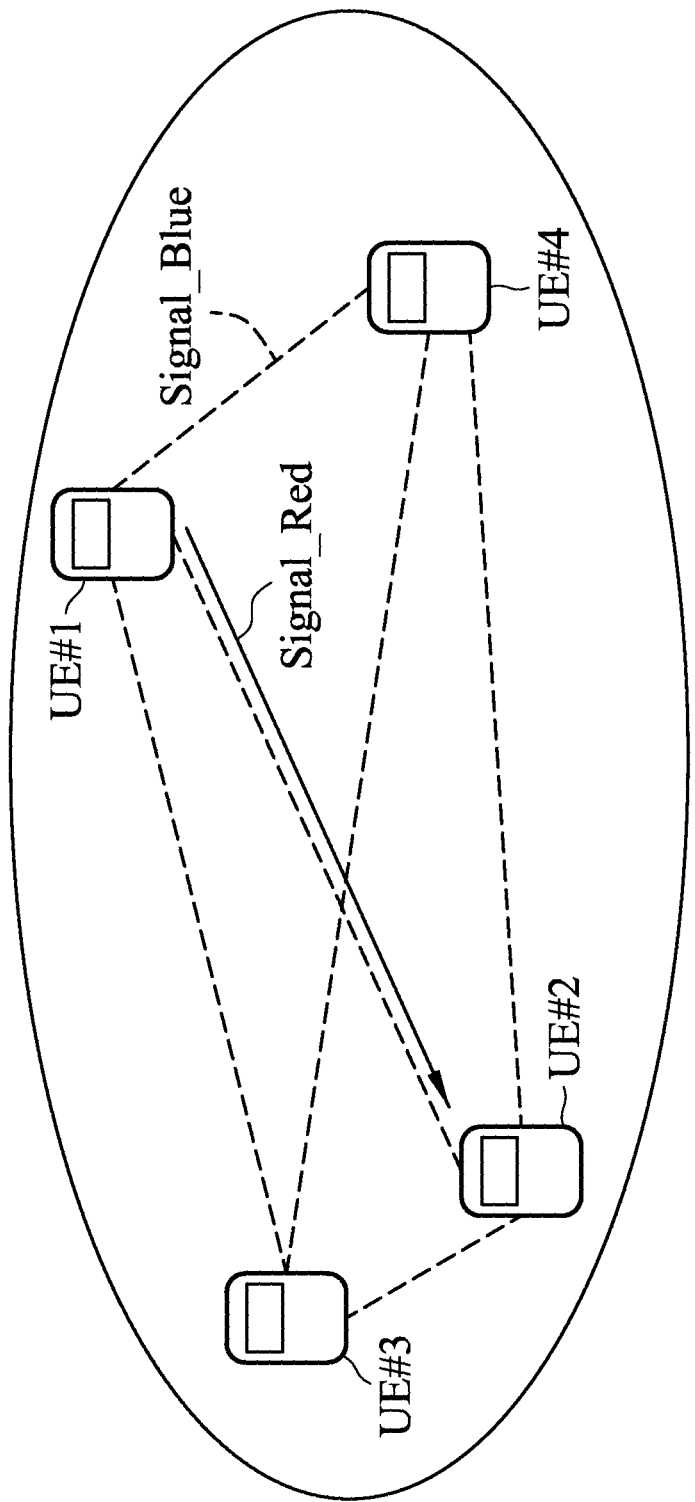
FIG. 6B is a schematic diagram illustrating an exemplary embodiment of triggering mechanism in accordance with the application.

In some embodiments, the D2D group further performs a triggering procedure to trigger a specific service using a fifth proximity signal, wherein the D2D group performs the triggering procedure by transmitting the fifth proximity signal to the second communication device for triggering the specific service. In another exemplary embodiment, the D2D devices are further performed a triggering procedure to trigger a specific service after they have been synchronized using a first proximity signal, wherein the triggering procedure may further comprise the step of transmitting a second proximity signal for triggering a specific service to the neighboring device. FIG. 6A is a flow chart illustrating a triggering procedure according to an exemplary embodiment of the application. In this embodiment, the triggering procedure may be applied in each of the communication devices of the D2D communications system 100 as shown in FIG. 1. First, a first proximity signal is broadcasted to sync among the D2D devices running a first application (step S602). Then, a second proximity signal is transmitted to a dedicated device for triggering a specific service in the first application with the dedicated device (step S604). An exemplary embodiment of triggering mechanism is presented in FIG. 6B. As shown in FIG. 6B, D2D devices UE#1~UE#4 form a D2D group. The D2D group provides two services: synchronization and data session. Synchronization among the D2D devices UE#1~UE#4 is achieved using a first proximity signal Signal_Blue. Data session initialization is achieved using a second proximity signal Signal_Red. The first and second proximity signal may be, for example, different RACH code. For example, the transmission of proximity signal may use two different codes (e.g. a pair of RACH codes). One code may indicate standby and continue to serve as the synchronization/keepalive purpose. The other code may trigger other event (e.g. when this activation code is sent, the other devices may know a data session will be activated). After the D2D devices UE#1~UE#4 are synchronized by the first proximity signal Signal_Blue, if the D2D device UE#1 wants to setup data session with the D2D device UE#2, the D2D device UE#1 may send the second proximity signal Signal_Red to the D2D device UE#2, in order to initialize the data session service. For example, the D2D devices UE#1~UE#4 running a specific application may first be synchronized by using the first proximity signal, and then the UE#1 may send the second proximity signal to UE#2, in order to initialize data session service with the UE#2 in the specific application.

In some embodiments, signaling configuration from the network entity to the D2D UEs are provided. The network entity may configure the D2D UEs using a radio resource control (RRC) layer or the medium access control (MAC) layer signaling, System Information Block (SIB)/Master Information Block (MIB), or broadcast/multicast services. In many communications systems, receivers may receive unicast, broadcast, or multicast data transmissions. For example, Multimedia Broadcast and Multicast Service (MBMS) is a service in which base stations transmit information of general interest on a commonly used channel, so that devices that subscribe to the service can access the MBMS channels to obtain a service of interest, such as daily news or baseball game scores.

In the LTE system, the RRC signaling is utilized to control the operation of the specific UE. Therefore the network entity, which can be the base station or some node in the core network like MME, may initialize the RRC signaling to configure the desired D2D UEs. In an embodiment, the predetermined threshold value may be configured by the RRC layer and broadcasted in the system information. Therefore, the communication device 110 may obtain the value of the predetermined threshold value by receiving the system information broadcasted by the cellular station 212. Although not shown, the controller module 114 may first receive the system information which is broadcasted by the cellular station 212 and includes the predetermined threshold value via the wireless module 112, to configure its predetermined threshold value.

In another embodiment, the network entity may configure a partial or all of the D2D devices. For example, the network entity may configure only the D2D devices within the same groups, the D2D devices in several groups, or all the D2D devices. The network entity may further configure the D2D devices using system information message. For example, the MIB or SIB in the LTE system can be utilized to configure a part or all the UEs within the cellular station 212's coverage.

In some embodiments, when the network entity is not the serving base station itself (e.g. the cellular station 212), the network entity may request the specific base station, or a set of several base stations, to distribute the SIB or MIB. In another embodiment, the network entity may also initialize a broadcast or multicast service (MBMS) to configure the D2D devices subscribing to the broadcast/multicast service.

In some embodiments, the network entity further configures a third proximity signal for a first group of the communication devices requesting for a first service and a fourth proximity signal for a second group of the communication devices requesting for a second service, wherein the third and fourth proximity signal is signal using different RACH code. In some embodiments, the network entity further configures a third proximity signal for a first group of the communication devices requesting for a first service via a first resource and configures the third proximity signal for a second group of the communication devices requesting for a second service via a second resource, wherein the first and second resource is different RACH resource.

In some embodiments, a third proximity signal is used for a first group of the communication devices requesting for a first service and a fourth proximity signal is used for a second group of the communication devices requesting for a second service, wherein the third and fourth proximity signal is signal using different Random Access Channel (RACH) code. In some embodiments, a third proximity signal is used for a first group of the communication devices requesting for a first service via a first resource and the third proximity signal is used for a second group of the communication devices requesting for a second service via a second resource, wherein the first and second resource is different RACH resource.

Therefore, according to D2D communications devices, systems and related D2D communications methods of the application, by sending and detecting proximity signals among the D2D devices, both application level proximity discovery and physical communication level proximity discovery can be achieved and synchronization among D2D devices can also be achieved. Moreover, in addition to proximity discovery, the D2D communications devices, systems and related D2D communications methods of the application can further facilitate the synchronization among D2D devices, keep D2D devices alive, or trigger applications or transmissions among the D2D devices, thereby achieving D2D communication among the D2D devices and significantly reducing occupied network resources.

The methods may be implemented in program code stored in a machine-readable storage medium, such as a magnetic tape, semiconductor, magnetic disk, optical disc (e.g., CD-ROM, DVD-ROM, etc.), or others, and when loaded and executed by a processing unit, a micro-control unit (MCU), or the controller module 114 in FIG. 1, the program code may perform the D2D communications method in a D2D communications system. In addition, the method may be applied to any D2D capable communication device supporting the WCDMA technology and/or the LTE technology.

While the application has been described by exemplary embodiments, it is to be understood that the application is not limited thereto. It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A mobile communications device for performing device-to-device (D2D) communications with a first neighboring mobile communications device, comprising:
   a wireless module, performing wireless transmissions and receptions;
   a counter, having a count value and a threshold value; and
   a controller module, determining whether to broadcast proximity signal via the wireless module according to a comparison result of the count value and the threshold value;
   wherein the controller module determines to broadcast a first proximity signal to the first neighboring mobile communications device via the wireless module when the count value reaches the threshold value;
   wherein the count value of the counter is changed according to a second proximity signal broadcasted by the first neighboring mobile communications device; and
   wherein the mobile communications device and the first neighboring mobile communications device are performing a first service and the count value of the counter is periodically increased by a first predetermined amount when no proximity signal is received and the count value of the counter is increased by a second predetermined amount when receiving the second proximity signal broadcasted by the first neighboring mobile communications device, or
      the controller module further resets the counter after the first proximity signal has been broadcasted.

2. The mobile communications device of claim 1, wherein the controller module further detects in proximity of the first neighboring mobile communications device when receiving the second proximity signal broadcasted by the first neighboring mobile communications device.

3. The mobile communications device of claim 1, wherein the controller module further periodically broadcasts the first proximity signal to the first neighboring mobile communications device or broadcasts the first proximity signal to the first neighboring mobile communications device according to the count value of the counter.

4. The mobile communications device of claim 1, wherein the first proximity signal is a CDMA code or a preamble.

5. The mobile communications device of claim 1, wherein the mobile communications device is synchronized with the first neighboring mobile communications device using a third proximity signal such that the mobile communications device and the first neighboring mobile communications device transmit the third proximity signal at the same time.

6. The mobile communications device of claim 5, wherein a second neighboring mobile communications device is neighbor to the mobile communication device, wherein the first, second and third mobile communications devices form a D2D group after the first, second and third mobile communications devices are synchronized using a fourth proximity signal and the D2D group further performs a keepalive procedure to check the existence of the third mobile communications device, wherein the D2D group performs the keepalive procedure by skipping a transmission of the fourth proximity signal during a first time period, detecting whether the second neighboring mobile communications device did not transmit the fourth proximity signal during the first time period and determining that the second neighboring mobile communications device is alive or not alive according to a determination result.

7. The mobile communications device of claim 1, wherein the controller module further receives a configuration request including configuration data from a network entity via the wireless module and applies the configuration data to the mobile communications device according to the configuration request, wherein the network entity is for configuring the mobile communications device and the first neighboring mobile communications device.

8. The mobile communications device of claim 1, wherein the first and second proximity signals are signals using different Random Access Channel (RACH) codes.

9. A device-to-device (D2D) communications system comprising at least a first and second mobile communications device for performing D2D communications, wherein each of the first and second mobile communications devices comprises:
   a wireless module, performing wireless transmissions and receptions;
   a counter, having a count value and a threshold value; and
   a controller module, determining whether to broadcast proximity signal via the wireless module according to a comparison result of the count value and the threshold value;
   wherein the controller module of the first mobile communications device determines to broadcast a first proximity signal to the second mobile communications device via the wireless module when the count value reaches the threshold value;
   wherein the count value of the first mobile communications device is changed according to a second proximity signal broadcasted by the second mobile communications device; and
   wherein the first and second mobile communications devices are performing a first service and the count value of the first mobile communications device is periodically increased by a first predetermined amount when no proximity signal is received and the count value of the first mobile communications device is increased by a second predetermined amount when receiving the proximity signal broadcasted by the second mobile communications device, or
      the controller module of the first mobile communications device further resets the counter of the first mobile communications device after the first proximity signal has been broadcasted.

10. The D2D communications system of claim 9, wherein the controller module of the first mobile communications device further detects in proximity of the second mobile communications device when receiving the second proximity signal broadcasted by the second mobile communications device.

11. The D2D communications system of claim 9, wherein the controller module of the first mobile communications device further periodically broadcasts the first proximity signal to the second mobile communications device or broadcasts the first proximity signal to the second mobile communications device according to the count value of the of the first mobile communications device.

12. The D2D communications system of claim 9, wherein the first proximity signal is a CDMA code or a preamble.

13. The D2D communications system of claim 9, wherein the first and second mobile communications devices are synchronized using a third proximity signal such that the first and second mobile communications devices transmit the third proximity signal at the same time.

14. The D2D communications system of claim 13, further comprising a third mobile communications device neighboring the first mobile communication device, wherein the first, second and third mobile communications devices form a D2D group after the first, second and third mobile communications devices are synchronized using a fourth proximity signal and the D2D group further performs a keepalive procedure to check the existence of the third mobile communications device, wherein the D2D group performs the keepalive procedure by skipping a transmission of the fourth proximity signal during a first time period, detecting whether the third mobile communications device did not transmit the fourth proximity signal during the first time period and determining that the third mobile communications device is alive or not alive according to a determination result.

15. The D2D communications system of claim 14, wherein the D2D group further performs a triggering procedure to trigger a specific service using a fifth proximity signal, wherein the D2D group performs the triggering procedure by transmitting the second proximity signal to the second mobile communications device for triggering the specific service.

16. The D2D communications system of claim 9, further comprising a network entity for configuring the first and second mobile communications devices, wherein the controller module of each of the first and second mobile communications devices further receives a configuration request including configuration data from the network entity via the wireless module of each of the first and second mobile communications devices and applies the configuration data to each of the first and second mobile communications devices according to the configuration request.

17. The D2D communications system of claim 16, wherein the network entity further configures a third proximity signal for a first group of the mobile communications devices requesting for a first service and a fourth proximity signal for a second group of the mobile communications devices requesting for a second service, wherein the third and fourth proximity signals are signals using different RACH codes.

18. The D2D communications system of claim 16, wherein the network entity further configures a third proximity signal for a first group of the mobile communications devices requesting for a first service via a first resource and configures the third proximity signal for a second group of the mobile communications devices requesting for a second service via a second resource, wherein the first and second resources are different RACH resources.

19. The D2D communications system of claim 16, wherein the network entity further manages code-interest mapping information which records mapping between different services and RACH codes or between different services and RACH resources corresponding thereto.

20. The D2D communications system of claim 9, wherein a third proximity signal is used for a first group of the mobile communications devices requesting for a first service and a fourth proximity signal is used for a second group of the mobile communications devices requesting for a second service, wherein the third and fourth proximity signals are signals using different Random Access Channel (RACH) codes.

21. The D2D communications system of claim 9, wherein a third proximity signal is used for a first group of the mobile communications devices requesting for a first service via a first resource and the third proximity signal is used for a second group of the mobile communications devices requesting for a second service via a second resource, wherein the first and second resources are different RACH resources.

22. A device-to-device (D2D) communications method for use in a D2D communications system comprising at least a first and second mobile communications devices, the D2D communications method comprising:

determining, by the first mobile communications device, whether to broadcast a first proximity signal to the second mobile communications device according to a comparison result of a count value and a threshold value of a counter of the first mobile communications device; and determining, by the first mobile communications device, to broadcast the first proximity signal to the second mobile communications device when the count value of the first mobile communications device reaches the threshold value, wherein the count value of the first mobile communications device is changed according to a second proximity signal broadcasted by the second mobile communications device, and wherein the method further comprise the step of:

increasing periodically the count value of the first mobile communications device by a first predetermined amount when no proximity signal is received and increasing the count value of the first mobile communications device by a second predetermined amount when receiving the second proximity signal broadcasted by the second mobile communications device, or resetting, by the first mobile communications device, the counter of the first mobile communications device after the first proximity signal has been broadcasted.

23. The D2D communications method of claim 22, further comprising:

detecting, by the first mobile communications device, in proximity of the second mobile communications device when receiving the second proximity signal broadcasted by the second mobile communications device.

24. The D2D communications method of claim 22, further comprising:

periodically broadcasting, by the first mobile communications device, the first proximity signal to the second mobile communications device or broadcasting, by the first mobile communications device, the first proximity signal to the second mobile communications device according to the count value of the of the first mobile communications device.

25. The D2D communications method of claim 24, wherein the first and second mobile communications devices are synchronized using a third proximity signal such that the first and second mobile communications devices transmit the third proximity signal at the same time.

26. The D2D communications method of claim 25, wherein the D2D communications system further comprises a third mobile communications device neighboring the first mobile communication device, wherein the first, second and third mobile communications devices form a D2D group after the first, second and third mobile communications devices are synchronized using a fourth proximity signal and the D2D group further performs a keepalive procedure to check the existence of the third mobile communications devices, wherein the keepalive procedure further comprises the steps of:

skipping, by the first mobile communication device, the transmission of the fourth proximity signal during a first time period;

detecting, by the first mobile communication device, whether the third mobile communications device did not transmit the fourth proximity signal during the first time period; and determining, by the first mobile communication device, that the third mobile communications device is alive or not alive according to a determination result.

27. The D2D communications method of claim 26, wherein the D2D group further performs a triggering procedure to trigger a specific service using a fifth proximity signal, wherein the triggering procedure further comprises the steps of transmitting, by the first mobile communication device, the fifth proximity signal to the second mobile communications device for triggering the specific service.

28. The D2D communications method of claim 22, wherein the D2D communications system further comprises a network entity for configuring the first and second mobile communications devices and the D2D communications method further comprises:

transmitting, by the network entity, a configuration request including configuration data to the first mobile communications device; and upon receiving the configuration request from the network entity, applying, by the first mobile communications device, the configuration data according to the configuration request.

\* \* \* \* \*